US008803454B2

(12) United States Patent
Daboussi et al.

(10) Patent No.: US 8,803,454 B2
(45) Date of Patent: Aug. 12, 2014

(54) SENSORLESS OPTIMUM TORQUE CONTROL FOR HIGH EFFICIENCY IRONLESS PERMANENT MAGNET MACHINE

(75) Inventors: Zaher Abdallah Daboussi, Abu Dhabi (AE); Scott Garrett Berman, Los Angeles, CA (US)

(73) Assignee: AeroVironment, Inc., Monrovia, CA (US)

( * ) Notice: Subject to any disclaimer, the term of this patent is extended or adjusted under 35 U.S.C. 154(b) by 24 days.

(21) Appl. No.: 13/547,453

(22) Filed: Jul. 12, 2012

(65) Prior Publication Data

US 2012/0326639 A1   Dec. 27, 2012

Related U.S. Application Data

(63) Continuation of application No. 12/565,741, filed on Sep. 23, 2009, now Pat. No. 8,242,720.

(60) Provisional application No. 61/194,030, filed on Sep. 23, 2008.

(51) Int. Cl.
    *H02P 21/00* (2006.01)

(52) U.S. Cl.
    USPC ............ 318/400.02; 318/400.01; 318/400.07; 318/400.14; 318/400.32; 318/721; 318/430; 318/432; 318/799

(58) Field of Classification Search
    USPC ............ 318/400.01, 400.02, 400.07, 400.14, 318/400.32, 432, 437, 599, 718, 801, 805, 318/807, 809, 400.04, 400.15, 400.33, 701, 318/721, 727, 400.34, 430, 434, 799; 388/805, 811, 815, 819, 800, 930
    See application file for complete search history.

(56) References Cited

U.S. PATENT DOCUMENTS 5,313,148 A   5/1994   Sears et al.
5,365,153 A   11/1994  Fujita et al.
(Continued)

FOREIGN PATENT DOCUMENTS

CN   1473391 A      2/2004
CN   102224664 A    10/2011
(Continued)

OTHER PUBLICATIONS

Prokop, L. et al., "3-phase BLDC Motor Control with Sensorless Back-EMF ADC Zero Crossing Detection Using 56F80x, Design of Motor Control Application Based on the Software Development Kit SDK," Freescale Semiconductor, Application Note AN 1913, Rev. 3, Nov. 2005, 60 pages.

(Continued)

*Primary Examiner* — Antony M Paul
(74) *Attorney, Agent, or Firm* — Nixon Peabody LLP; Erik Aagaard (57) ABSTRACT

Embodiments of the present invention permit the optimization of torque control of a permanent magnet machine including obtaining instantaneous terminal voltages of the machine, transforming the instantaneous terminal voltages to a zero direct axis voltage and a non-zero quadrature axis voltage, using a mathematical transformation, regulating the electrical frequency of the permanent-magnet machine such that the zero direct-axis voltage is adjusted to have a value of zero, determining a non-final electrical angle of the permanent-magnet machine by applying an integrator to the regulated electrical frequency of the machine, determining a final electrical angle of the of the machine by integrating the non-final electrical angle and an electrical angle from a previous calculation cycle, and regulating the current vector of the machine such that the current vector is perpendicular to the final electrical angle of the machine, thereby optimizing the torque of the machine.

18 Claims, 7 Drawing Sheets

(56) References Cited

U.S. PATENT DOCUMENTS

| | | | |
|---|---|---|---|
| 5,428,522 | A | 6/1995 | Millner et al. |
| 5,977,737 | A | 11/1999 | Labriola, II |
| 6,703,803 | B2 | 3/2004 | Ohiwa et al. |
| 6,703,809 | B2 * | 3/2004 | Royak et al. ............. 318/727 |
| 7,064,504 | B2 * | 6/2006 | Imai et al. ............ 318/400.04 |
| 7,106,024 | B2 | 9/2006 | Harbaugh et al. |
| 7,193,383 | B2 * | 3/2007 | Sarlioglu et al. ............ 318/438 |
| 7,202,622 | B2 | 4/2007 | Eskritt et al. |
| 7,208,908 | B2 | 4/2007 | Anghel et al. |
| 7,230,837 | B1 | 6/2007 | Huang et al. |
| 7,245,104 | B2 * | 7/2007 | Tomigashi et al. ........... 318/705 |
| 7,339,344 | B2 * | 3/2008 | Borisavljevic et al. ....... 318/723 |
| 7,358,696 | B2 | 4/2008 | Iwanaga et al. |
| 7,525,269 | B2 | 4/2009 | Patel et al. |
| 7,652,441 | B2 | 1/2010 | Ying Yin Ho |
| 7,772,725 | B2 | 8/2010 | Siman-Tov |
| 8,031,495 | B2 | 10/2011 | Sachdeva et al. |
| 8,242,720 | B2 | 8/2012 | Daboussi et al. |
| 8,242,731 | B2 | 8/2012 | Daboussi et al. |
| 2004/0100216 | A1 | 5/2004 | Makaran et al. |
| 2005/0225275 | A1 | 10/2005 | Eskritt et al. |
| 2006/0006829 | A1 | 1/2006 | Anghel |
| 2007/0001635 | A1 | 1/2007 | Ho |
| 2007/0040528 | A1 | 2/2007 | Tomigashi et al. |
| 2007/0132415 | A1 | 6/2007 | Patel et al. |
| 2008/0265808 | A1 * | 10/2008 | Sparey et al. ............ 318/139 |
| 2010/0188033 | A1 | 7/2010 | Daboussi et al. |
| 2012/0326639 | A1 | 12/2012 | Daboussi et al. |
| 2012/0326651 | A1 | 12/2012 | Daboussi |

FOREIGN PATENT DOCUMENTS

| | | |
|---|---|---|
| CN | 102224672 A | 10/2011 |
| JP | H06-14405 A | 1/1994 |
| JP | 09-331693 A | 12/1997 |
| JP | 2003-200839 A | 7/2003 |
| JP | 2006-121891 A | 5/2006 |
| JP | 2012-503961 A | 2/2012 |
| JP | 2012-503962 A | 2/2012 |
| KR | 2011-0055746 A | 5/2011 |
| KR | 10-1244299 | 3/2013 |
| KR | 10-1246049 | 3/2013 |
| WO | 2010/036744 A1 | 4/2010 |

OTHER PUBLICATIONS

International Search Report in PCT Application No. PCT/US2009/058117, mailed Nov. 24, 2009.
International Search Report in PCT Application No. PCT/US2009/058119, mailed Nov. 20, 2009.
Search Report and Written Opinion in Singapore Patent Application No. 201102802-4, mailed Dec. 2, 2011.
Office Action in U.S. Appl. No. 12/565,727, mailed Jan. 6, 2012.
Search Report and Written Opinion in Singapore Patent Application No. 201102800-8, mailed Dec. 2, 2011.
Search and Examination Report in Singapore Patent Application No. 201102800-8, mailed Aug. 22, 2012.
Search and Examination Report in Singapore Patent Application No. 201102802-4, mailed Aug. 22, 2012.
Office Action in U.S. Appl. No. 12/565,741 dated Jan. 17, 2012.
Office Action in Korea Patent Application No. 10-2000-7009295 dated Jun. 26, 2012.
Notice of Allowance in Korea Patent Application No. 10-2000-7009295 dated Dec. 20, 2012.
Search Report in Chinese Application No. 200980146650.4, dated Mar. 13, 2013.
Office Action in Chinese Application No. 200980146650.4, dated Mar. 22, 2013.
Office Action in Japanese Application No. 2011-528095, dated Apr. 18, 2013.
Notice of Allowance in U.S. Appl. No. 13/460,976, mailed on Jun. 25, 2013.
Japanese Office Action in Japanese Application No. 2011-528096, mailed on Apr. 23, 2013.
Office Action in CA Application No. 2,740,401, dated Jan. 23, 2013.
Office Action in AU Application No. 2009296685, dated Jan. 2, 2013.
Office Action in CA Application No. 2,740,404, dated Jan. 29, 2013.
Office Action in U.S. Appl. No. 13/460,976, dated Mar. 14, 2013.
First Examination Report for Australian Patent Application No. 2009296683, mailed on Mar. 1, 2013.
Second Examination Report for Australian Patent Application No. 2009296683, mailed on Sep. 12, 2013.
Office Action in Korean Patent Application No. 10-2011-7008982, mailed on Jun. 26, 2012.
Notice of Allowance in Korean Patent Application No. 10-2011-7008982, mailed on Dec. 20, 2012.
Notice of Allowance in U.S. Appl. No. 12/565,741 dated Apr. 27, 2012.
Notice of Allowance in U.S. Appl. No. 12/565,727 dated Apr. 19, 2012.
Office Action in Chinese Application No. 200980146648.7, mailed on May 31, 2013.
International Preliminary Report on Patentability for PCT/US2009/058119, mailed on Apr. 7, 2011.
Notice of Allowance in Japanese Patent Application No. 2011-528095, mailed on Oct. 8, 2013.
Second Office Action for Japanese Patent Application No. 2011-528096 dated Feb. 10, 2014.

* cited by examiner

FIG. 1

(PRIOR ART)

SENSORLESS OPTIMUM TORQUE CONTROL FOR HIGH EFFICIENCY IRONLESS PERMANENT MAGNET MACHINE

This application is a continuation of U.S. patent application Ser. No. 12/565,741, filed Sep. 23, 2009, titled SENSORLESS OPTIMUM TORQUE CONTROL FOR HIGH EFFICIENCY IRONLESS PERMANENT MAGNET MACHINE, which claims priority to U.S. Provisional Patent Application No. 61/194,030, filed Sep. 23, 2008, entitled "SENSORLESS OPTIMUM TORQUE CONTROL FOR HIGH EFFICIENCY IRONLESS PM MACHINES", the entire disclosure of which is incorporated by reference herein.

TECHNICAL FIELD

1. Field of the Invention

The invention relates to a method and system for measuring the rotor position of a permanent magnet machine. More specifically, the invention relates to a method and system for using the terminal voltages and currents of an ironless permanent-magnet (PM) machine to perform sensorless motoring and generation operations.

2. Description of Related Art

Figure 1:
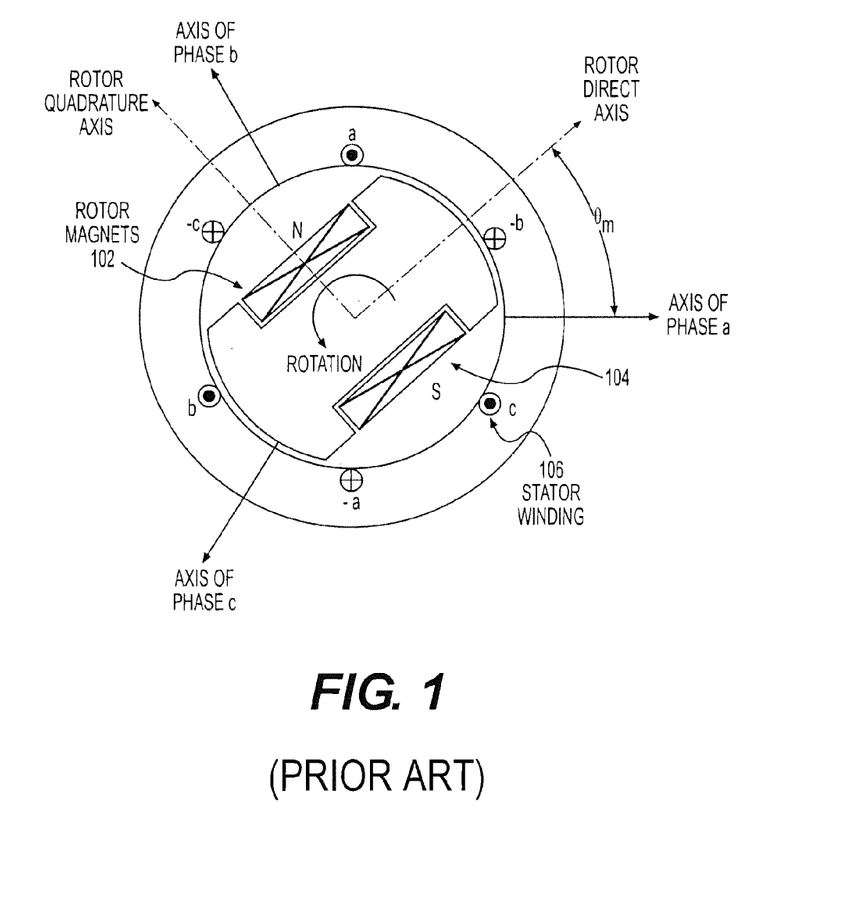
FIG. 1 is a schematic diagram of a conventional permanent magnet machine.
Figure 1A:
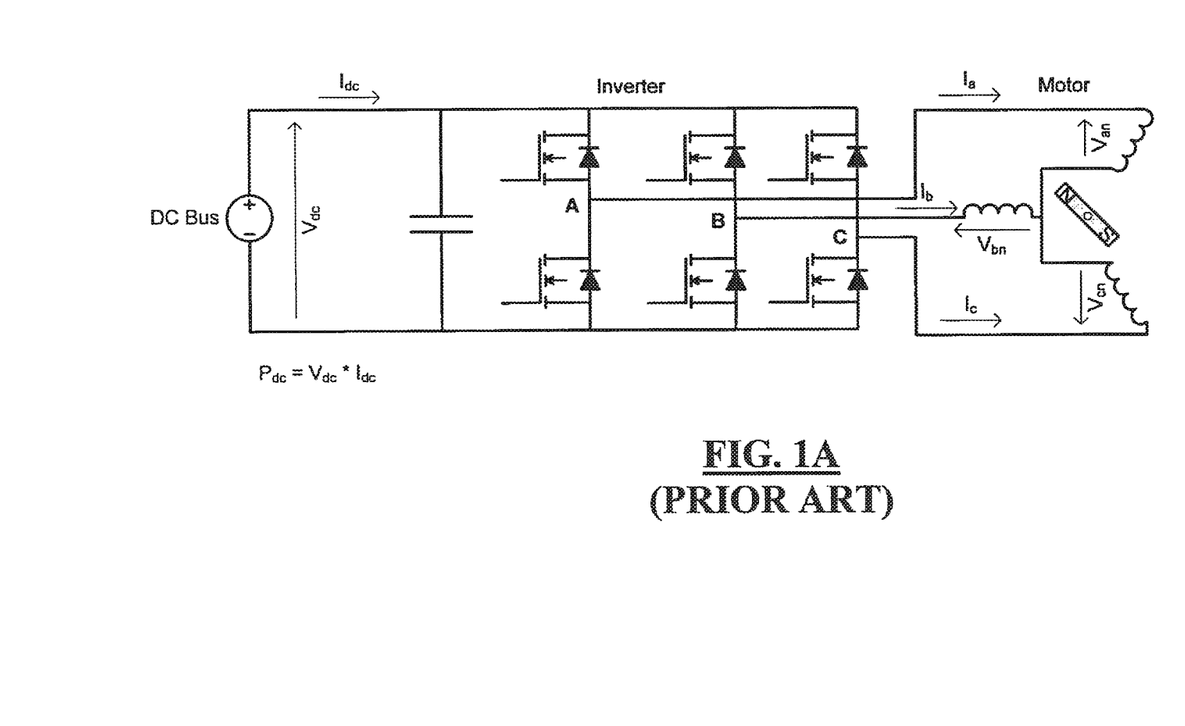
FIG. 1A is a motor/inverter electric diagram for such an arrangement.

A permanent magnet machine is a type of alternating current (AC) motor whereby power is supplied to the rotating device by means of imposing an electromagnetic field perpendicular to a field generated by permanent rotor magnets, and is illustrated by FIG. 1. A motor/inverter electric diagram for such an arrangement is shown in FIG. 1A. To control an AC permanent magnet machine, the absolute position of the magnetic field produced by the rotor permanent magnets (PM) 102, 104 should be known at all times. The magnets' position are important for determining the stator current magnitude of the machine necessary to produce the desired torque. This operation is known as the stator current commutation. Since the magnets are rotating with respect to the stator 106, the magnets' position can be calculated by measuring the rotor absolute angular position. Absolute position sensors such as resolvers and optical encoders are typically used to measure the absolute angular position of the machine rotor. From the position information the machine angular speed can also be calculated Commonly used angular position sensors are mechanically coupled to the machine rotor. For some applications severe environmental conditions and/or tight mechanical integration concerns of such devices can lead to challenges, particularly if high operation reliability is required. To some of these applications, mechanically mounted position sensors are considered a weak link, i.e., a critical single point of failure. For cost sensitive applications, the high cost of the absolute position sensor can be a problem.

OVERVIEW

The present invention exploits both the terminal voltages and currents of an ironless permanent-magnet machine to perform sensorless electric motoring and generation operations. In estimating the electromotive force (emf) of the machine, the present invention takes advantage of the low per unit inductance of an ironless machine and uses the machine terminal voltages, which closely represent the machine emf. Some compensation is also included to offset any influence resulting from ohmic and inductive voltage drop due to the presence of stator current. Also as will be shown below, this approach takes advantage of the DC nature of the machine voltages and currents that result from the d-q rotating reference frame transformation. The present invention provides a very wide range of position and speed sensing, which allows the machine to effectively start even under very difficult starting torque conditions such as those associated with internal combustion engine. Furthermore, the present invention incorporates a torque angle optimization scheme which leads to a more efficient operation of the machine.

Embodiments of the present invention relate to a computer-implemented method for sensorless torque control by determining a rotor position using terminal voltages and currents of an ironless permanent-magnet machine to perform sensorless electric motoring and generation operations, including obtaining instantaneous terminal voltages of the machine, transforming the instantaneous terminal voltages to a zero direct axis voltage and a non-zero quadrature axis voltage, regulating the electrical frequency of the permanent-magnet machine such that the zero direct-axis voltage is adjusted to have a value of zero, determining a non-final electrical angle of the permanent-magnet machine by integrating the change of electrical angle ($\Delta\theta e$) which is the electrical frequency multiplied by $2\pi/f_{sample}$ (sample rate). The electrical frequency is determined by summing the result of a feed forward that approximates the electrical frequency by dividing the terminal voltage by the motor voltage constant ($K_e$) and the output of a phase locked loop that computes the frequency error by regulating the direct axis voltage ($V_d$) to zero. The method further includes determining a final electrical angle of the of the machine by integrating the non-final electrical angle and an electrical angle from a previous calculation cycle, and regulating the current vector of the machine such that the current vector is perpendicular to the final electrical angle of the machine, thereby optimizing the torque of the machine.

The embodiments of the present invention also relate to a system for sensorless torque control by determining a rotor position using terminal voltages and currents of an ironless permanent-magnet machine to perform sensorless motoring and generation operations, including means for obtaining instantaneous terminal voltages of the machine, means for transforming the instantaneous terminal voltages to a zero direct axis voltage and a non-zero quadrature axis voltage, means for regulating the electrical frequency of the permanent-magnet machine such that the zero direct-axis voltage is adjusted to have a value of zero, means for determining a non-final electrical angle of the permanent-magnet machine by applying an integrator to the regulated electrical frequency of the machine, means for determining a final electrical angle of the of the machine by integrating the non-final electrical angle and an electrical angle from a previous calculation cycle, and means for regulating the current vector of the machine such that the current vector is perpendicular to the final electrical angle of the machine, thereby optimizing the torque of the machine.

Furthermore, the embodiments of the present invention relate to a computer-readable medium for sensorless torque control by determining a rotor position using terminal voltages and currents of an ironless permanent-magnet machine to perform sensorless motoring and generation operations, including means for obtaining instantaneous terminal voltages of the machine, means for transforming the instantaneous terminal voltages to a zero direct axis voltage and a non-zero quadrature axis voltage, means for regulating the electrical frequency of the permanent-magnet machine such that the zero direct-axis voltage is adjusted to have a value of zero, means for determining a non-final electrical angle of the permanent-magnet machine by applying an integrator to the regulated electrical frequency of the machine, means for determining a final electrical angle of the of the machine by integrating the non-final electrical angle and an electrical angle from a previous calculation cycle, and means for regulating the current vector of the machine such that the current vector is perpendicular to the final electrical angle of the machine, thereby optimizing the torque of the machine.

In addition, the embodiments of the present invention relate to a computer-implemented method for sensorless torque control by determining a rotor position using terminal voltages and currents of an ironless permanent-magnet machine to perform sensorless motoring and generation operations, including obtaining instantaneous terminal voltages of the machine, transforming the instantaneous terminal voltages to a zero direct axis voltage and a non-zero quadrature axis voltage, using a mathematical transformation, regulating the electrical frequency of the permanent-magnet machine such that the zero direct-axis voltage is adjusted to a value of zero, determining a non-final electrical angle of the machine from the regulated electrical frequency, determining a final electrical angle of the of the machine by integrating the non-final electrical angle and an electrical angle from a previous calculation cycle, optimizing the electrical angle by observing the DC power supply that is in an inverter of the machine, and regulating the current vector of the machine such that the current vector is perpendicular to the final electrical angle of the machine, thereby optimizing the torque of the machine.

The embodiments of the present invention further relate to a system for sensorless torque control by determining a rotor position using terminal voltages and currents of an ironless permanent-magnet machine to perform sensorless motoring and generation operations, including means for obtaining instantaneous terminal voltages of the machine, means for transforming the instantaneous terminal voltages to a zero direct axis voltage and a non-zero quadrature axis voltage, using a mathematical transformation, means for regulating the electrical frequency of the permanent-magnet machine such that the zero direct-axis voltage is adjusted to a value of zero, means for determining a non-final electrical angle of the machine from the regulated electrical frequency, means for determining a final electrical angle of the of the machine by integrating the non-final electrical angle and an electrical angle from a previous calculation cycle, means for optimizing the electrical angle by observing the DC power supply that is in an inverter of the machine, and means for regulating the current vector of the machine such that the current vector is perpendicular to the final electrical angle of the machine, thereby optimizing the torque of the machine.

Moreover, the embodiments of the present invention relate to a computer-readable medium for sensorless torque control by determining a rotor position using terminal voltages and currents of an ironless permanent-magnet machine to perform sensorless motoring and generation operations, including means for obtaining instantaneous terminal voltages of the machine, means for transforming the instantaneous terminal voltages to a zero direct axis voltage and a non-zero quadrature axis voltage, using a mathematical transformation, means for regulating the electrical frequency of the permanent-magnet machine such that the zero direct-axis voltage is adjusted to a value of zero, means for determining a non-final electrical angle of the machine from the regulated electrical frequency, means for determining a final electrical angle of the of the machine by integrating the non-final electrical angle and an electrical angle from a previous calculation cycle, means for optimizing the electrical angle by observing the DC power supply that is in an inverter of the machine, and means for regulating the current vector of the machine such that the current vector is perpendicular to the final electrical angle of the machine, thereby optimizing the torque of the machine

BRIEF DESCRIPTION OF THE DRAWINGS

The invention is described through a preferred embodiment and the attached drawings in which.

DETAILED DESCRIPTION OF THE PREFERRED EMBODIMENT

The prior art is limited to the six-step mode of current commutation where the current waveforms are square waveforms as opposed to sinusoidal waveforms. Previous sensorless methods devised to address sinusoidal excitation suffer from extreme complexity. Conventionally, a mathematical model of the system must be created, and estimation of the rotor position is accomplished using a Kalman filter. These approaches are inherently sensitive to numerical computation and require high accuracy in the model of the motor plant.

Applicants have discovered a proposed sensorless approach that overcomes the above-recited deficiencies of the prior art by eliminating the need for a mechanical device to sense the rotor's absolute angular position. Moreover, the method of the present invention uses a simple mathematical model to make accurate measurements of the machine's voltages and currents. Additionally, the proposed approach makes use of the machine measured variable to adjust for any variations in the machine parameters due to temperatures or other operational effects, thus improving control of the device.

The permanent magnet motor used in one embodiment of the present invention is illustrated in FIG. 1. The motor/generator of the present invention includes, among other things, ironless rotor magnets 102, 104, as well as a stator 106. A motor/inverter electric diagram for such an arrangement is shown in FIG. 1A.

Figure 2:
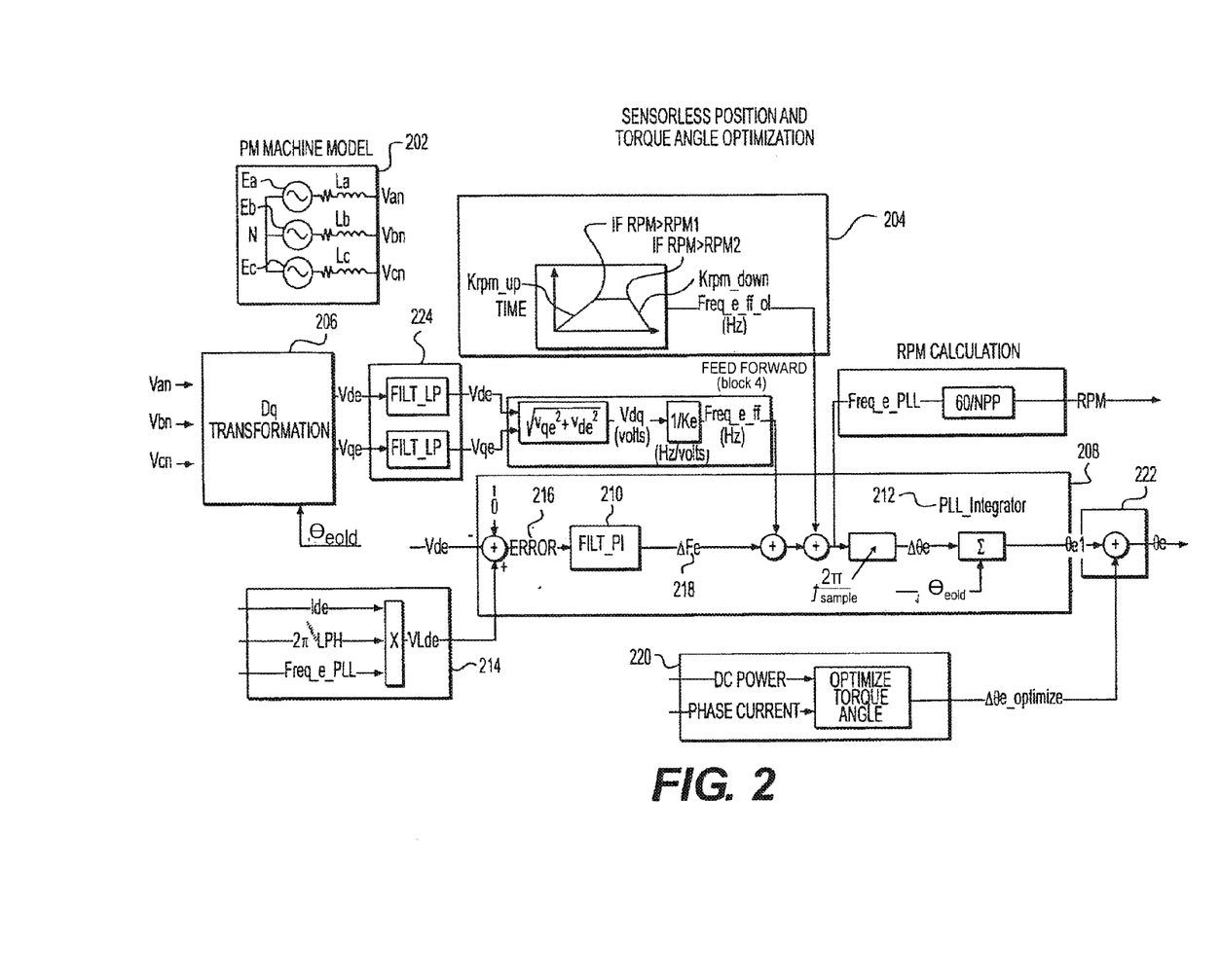
FIG. 2 is a sensorless position flowchart in accordance with the preferred embodiment of the present invention.

FIG. 2 illustrates a signal flow diagram for determining the electrical angle of the machine used for optimizing the torque control of the machine as seen in a preferred embodiment of the present invention. The machine model 202 includes schematic representations for three voltage sources $E_a$, $E_b$, and $E_c$, three resistors $R_a$, $R_b$, and $R_c$, and three inductors $L_a$, $L_b$, and $L_c$, although other configurations may be contemplated.

Figure 2A:
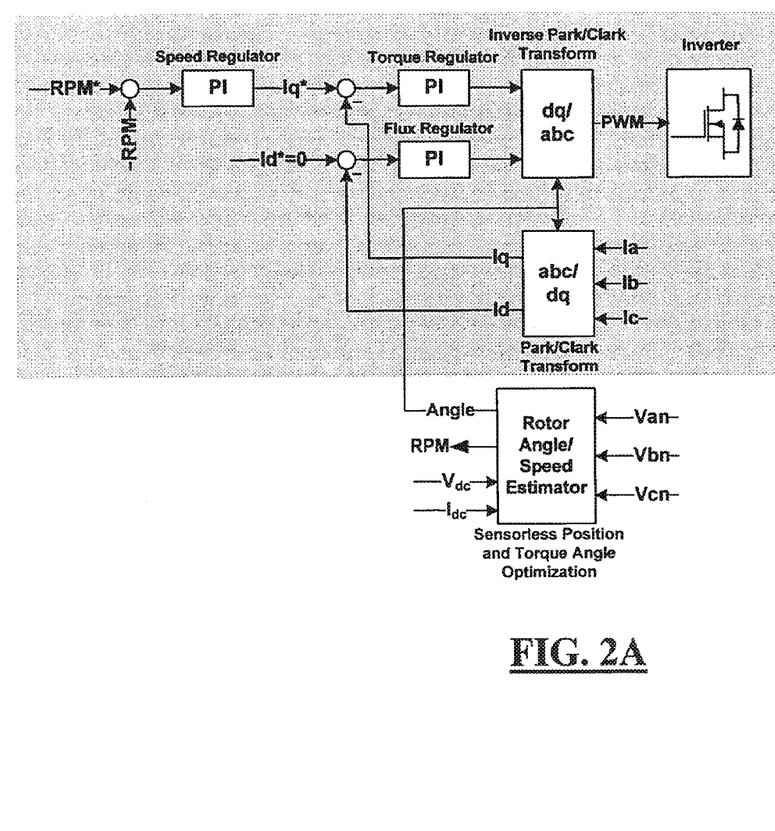
FIG. 2A shows a PMSM (permanent magnet synchronous machine) field-oriented control diagram.

The motor 202 is able to receive digital signals which dictate the motor's movement. For instance, with reference to FIG. 2A showing the PMSM (permanent magnet synchronous machine) field-oriented control diagram, the motor is started spinning by the motor setting the current vector Iq to a very high DC magnitude. Setting the current vector Iq to a high constant value enables the magnetic field vector of the motor to align itself with the current vector Iq. At this initial time, the torque angle of the motor is near zero Next, as graphically represented at 204, the frequency is incrementally raised over time thereby changing the electrical angle, which then changes the angle at which the current is set. Then, the magnets in the motor track the current vector $I_q$ as it begins to move. Having the magnets in the motor track the moving current vector $I_q$ starts the motor spinning. Once the spinning creates a large enough emf in the machine, the position estimator over to closed loop position estimation. Also, as seen in item 202, once the machine starts turning, the instantaneous machine measured variables $V_{an}$, $V_{bn}$, and $V_{cn}$ are obtained.

At a certain point, once the back emf coming from the motor is high enough to be a measurable quantity, an analog-to-digital converter (ADC), which is not shown, is used to convert the analog voltages coming into the motor into three digital readings of the instantaneous terminal voltages $V_{an}$, $V_{bn}$, and $V_{cn}$, thus beginning a calculation cycle.

Once the digital values for the instantaneous terminal voltages $V_{an}$, $V_{bn}$, and $V_{cn}$ have been obtained, these voltages are transformed using a mathematical transformation 206 that converts the sinusoidal machine waveform into DC quantities. This mathematical transformation can be a direct-quadrature-zero transformation (dq0), although other mathematical transformations may be contemplated. The dq0 transformation is an expression that uses the machine electrical angular position to perform the transformation.

Figure 4:
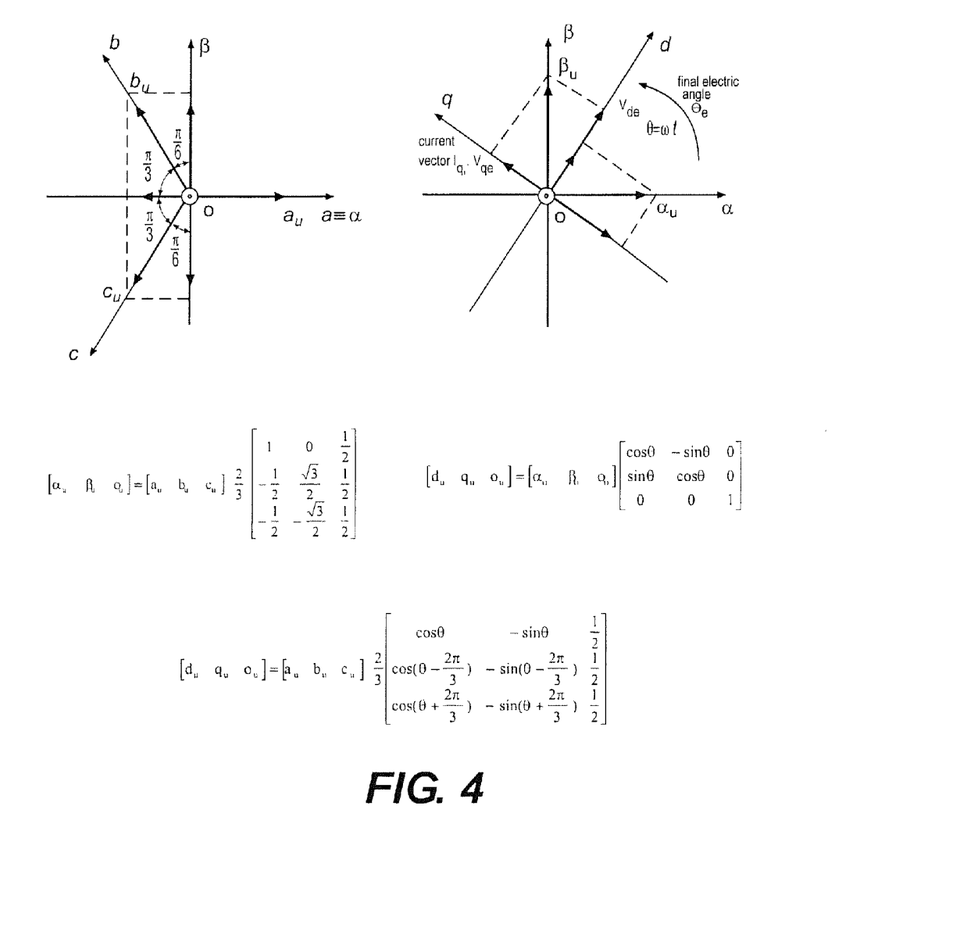
FIG. 4 is a graphical representation of a mathematical transformation in accordance with one embodiment of the present invention.

The transformation is accomplished by establishing a d-q reference frame with the d-axis aligned with the airgap magnetic field of the machine and the q-axis in quadrature, i.e., 90° from the d-axis. If the d-axis is aligned with the magnetic field, then the frequency of rotation of the reference frame is identical to the machine magnetic field and the transformation of the machine open circuit terminal voltages will result in a zero direct axis voltage $V_{de}$, and a nonzero quadrature axis voltage $V_{qe}$, as seen in FIG. 4. The steps of the dq0 transformation will now be detailed.

A direct-quadrature-zero (dq0) transformation is a transformation of coordinates from the three-phase stationary coordinate system to the dq rotating coordinate system. This transformation is made in two steps, and is performed by:

1) a transformation from the three-phase stationary coordinate system to the two-phase αβ stationary coordinate system; and
2) a transformation from the αβ stationary coordinate system to the dq rotating coordinate system.

Graphical representations of these steps are shown in FIG. 4. A representation of a vector in n-dimensional space is accomplished through the product of a transpose n-dimensional vector (base) of coordinate units and a vector representation of the vector, whose elements are corresponding projections on each coordinate axis, normalized by their unit values. In three phase (i.e., three dimensional) space, it looks like this:

$$X_{abc} = \begin{bmatrix} a_u & b_u & c_u \end{bmatrix} \begin{bmatrix} x_a \\ x_b \\ x_c \end{bmatrix}$$

Assuming a three-phase system ($x_o=0$), a three-phase vector representation transforms to a dq vector representation (zero-axis component is 0) through the transformation matrix T, defined as:

$$T = \frac{2}{3} \begin{bmatrix} \cos(\omega t) & \cos\left(\omega t - \frac{2}{3}\pi\right) & \cos\left(\omega t + \frac{2}{3}\pi\right) \\ -\sin(\omega t) & -\sin\left(\omega t - \frac{2}{3}\pi\right) & -\sin\left(\omega t + \frac{2}{3}\pi\right) \end{bmatrix}$$

In other words, the transformation from $$X_{abc} = \begin{bmatrix} X_a \\ X_b \\ X_c \end{bmatrix}$$

(three-phase coordinates) to $$X_{dq} = \begin{bmatrix} X_d \\ X_q \end{bmatrix}$$

(dq rotating coordinates), called Park's transformation, is obtained through the multiplication of the vector $X_{abc}$ by the matrix T, i.e., $X_{dq}=TX_{abc}$. From the matrix T, ω is the frequency, t is time, and ω=dθ/dt. In the present invention, the variable X is actually voltage V. Conversely, the inverse transformation from dq rotating coordinates to three-phase coordinates is calculated as $X_{abc}=T'X_{dq}$, where the inverse transformation matrix is defined as:

$$T' = \begin{bmatrix} \cos(\omega t) & -\sin(\omega t) \\ \cos\left(\omega t - \frac{2}{3}\pi\right) & -\sin\left(\omega t - \frac{2}{3}\pi\right) \\ \cos\left(\omega t + \frac{2}{3}\pi\right) & -\sin\left(\omega t + \frac{2}{3}\pi\right) \end{bmatrix}$$

Figure 3:
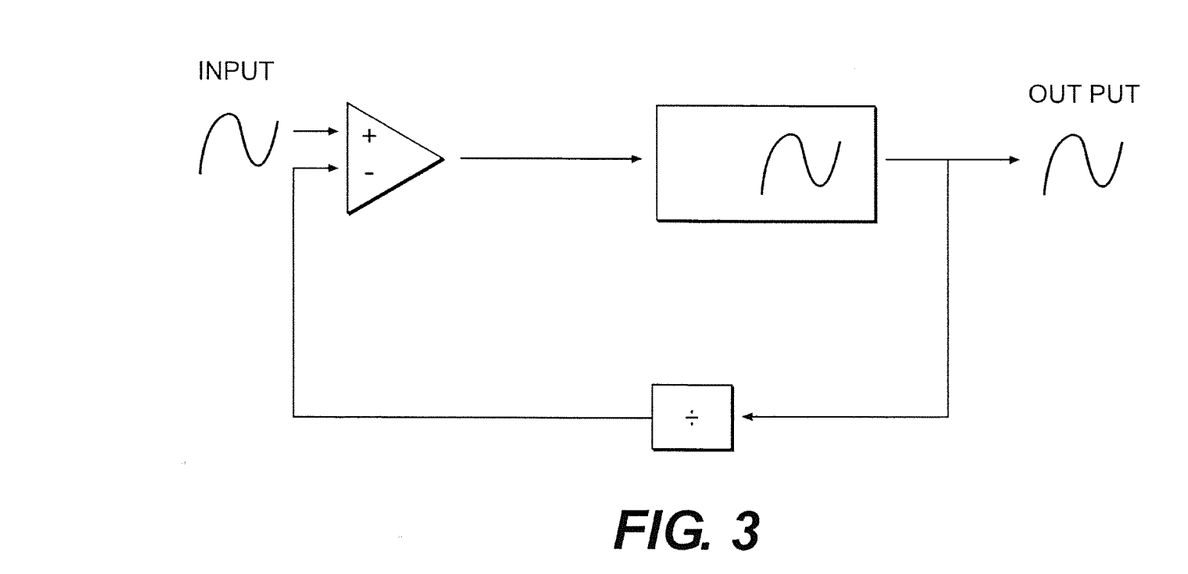
FIG. 3 is a signal flow diagram of a phase lock loop as seen in one embodiment of the present invention.

While the machine is turning, the processor is determining the electrical angle $\theta_e$ that is the position of the rotor with respect to the stator. The processor accomplishes this by regulating $V_{de}$ to be equal to zero, as seen in FIG. 2. The value of $V_{de}$ is calculated using the dq transformation as delineated above. The measurement of $\theta_{eold}$ from a prior calculation cycle is initially assumed by the processor, and is also input into the Dq transformation. Next, a phase locked loop (PLL) 208 determines the electrical angle $\theta_e$ of the calculation cycle as seen in FIG. 3. The PLL includes a proportional-integral regulator 210 and an integrator 212. This type of PLL is known as type-II PLL. The PLL functions to track the angular position of the rotor electrical position by adjusting the reference frame angles such that $V_{de}$ is kept at zero.

In a more general sense, a phase locked loop is a control system that generates a signal that has a fixed relation to the phase of a reference signal. A phase locked loop circuit responds to control both the frequency and the phase of the input signals of the motor, automatically raising or lowering the frequency of a controlled oscillator until it is matched to the reference in both frequency and phase. Phase locked loop mechanisms may be implemented as either analog or digital circuits. Both implementations use the same basic structure, including three basic elements: a phase detector, a variable electronic oscillator, and a feed back path which often includes a frequency divider.

A phase locked loop compares the two frequencies of two signals and produces an error signal which is proportional to the difference between the input frequencies. The error signal is then low-pass filtered and used to drive a voltage-controlled oscillator which creates an output frequency. The output frequency is fed through a frequency divider back to the input of the system, producing a negative feedback loop. If the output frequency drifts, the error signal will increase, driving the voltage-controlled oscillator (VCO) frequency in the opposite direction so as to reduce the error. Thus the output is locked to the frequency at the other input. This input is called the reference and is often derived from a crystal oscillator, which is very stable in frequency. A basic block diagram of a phase lock loop can be seen in FIG. 3.

As previously stated, the initial value of the electrical angle $\theta_{eold}$ that is input into the phase locked loop is assumed from the previous calculation cycle. This value of $\theta_{eold}$ and the values of the instantaneous voltages, $V_{an}$, $V_{bn}$, and $V_{cn}$, are run though the Dq transformation, and the values of $V_{de}$ and $V_{qe}$ are then output. After it is obtained, the value for $V_{de}$ is input into block 208, and the processor then subtracts $V_{de}$ from 0, to determine an error value. It is an error value since initially $V_{de}$ is a non-zero value. Furthermore, a machine impedance compensator factor may also be input into block 208. This is because the terminal voltages are being used to determine $V_{de}$, rather than the actual back emf of the machine.

The processor assumes that the resistors $R_a$, $R_b$, and $R_c$ of the permanent magnet (PM) machine are near zero, and thus there are only the inductors $L_a$, $L_b$, and $L_c$ in the PM machine model. Thus, since the processor is interested in the output of the AC voltage source, but only the output of the voltage source plus the inductor is measurable, the processor determines the voltage drop across the inductor, which is $V_{Lde}=I\omega L$. The value of $V_{Lde}$ is also input into the phase lock loop 212, and this value may be used to adjust the initial input value of $V_{de}$, thereby compensating for the inductance of the machine.

The obtained error value 216 is then processed by a proportional integral controller 210 which is called a PI filter, to obtain the electrical frequency $\Delta f_e$ 218 at which the machine is rotating.

Next, the process determines a value for $\Delta\theta_e$ by multiplying $\Delta f_e$ 218 by a factor of $2\pi$, $\Delta\theta_e$ has units of radians/calculation cycle. The process then inputs the electrical angle from the previous calculation cycle, $\theta_{eold}$ and $\Delta\theta_e$ through an integrator 212, which sums these values, and outputs the value for the new electrical angle $\theta_{e1}$ for the machine for that particular calculation cycle.

At this point the processor has determined the electrical angle $\theta_{e1}$ of the machine, and the current regulator can now use the electrical angle $\theta_{e1}$ to regulate the current vector $I_q$ of the machine such that $I_q$ is perpendicular to $\theta_{e1}$. The inverter imposes a current on the machine, which regulates the current vector perpendicular to the magnetic field vector, which is in phase with $V_q$.

In an alternate embodiment of the present invention the angle $\theta_{e1}$ may be further optimized by the processor. In this particular embodiment, the processor adjusts the electrical frequency of the machine, and determines if the DC power going into the inverter of the machine is being increased or decreased. If the power decreases then the processor continues in that direction until the power increases, at which point the process has determined a value for $\Delta\theta_{eoptimize}$. The value for $\Delta\theta_{eoptimize}$ can then be input, along with the value for $\theta_{e1}$ into a summation block 222 to determine an optimized electrical angle $\theta_e$ for the machine.

In another embodiment of the present invention, the output of the Dq transformation is filtered, using a low pass filter 224, to reduce the noise resulting from the machine's non-ideal waveforms and switching noise. A low-pass filter is a filter that passes low-frequency signals but attenuates (reduces the amplitude of) signals with frequencies higher than the cutoff frequency. The actual amount of attenuation for each frequency varies from filter to filter. This feed forward frequency $f_{eff}$ may also be input into the phase lock loop 208 and be used to determine a more optimum electrical angle of the machine.

Figure 5:
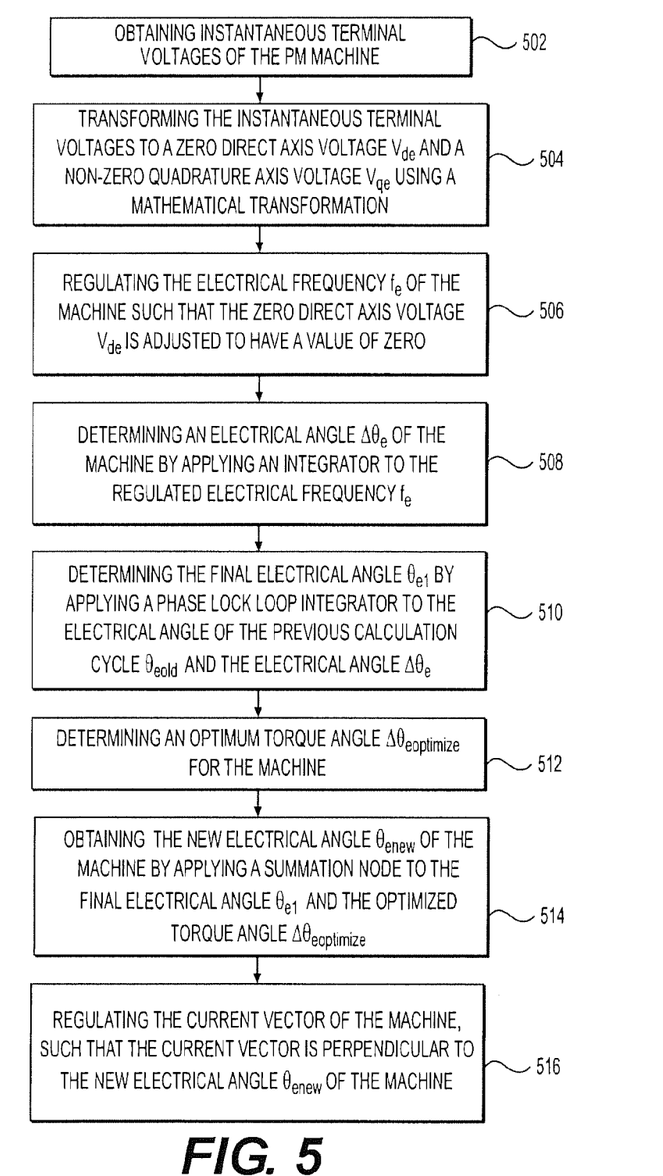
FIG. 5 is a flowchart of sensorless torque control of a permanent magnet machine.

FIG. 5 illustrates a flowchart for optimizing the torque of a permanent magnet machine in one embodiment of the present invention. In step 502, the terminal voltages of the permanent magnet machine are obtained. The terminal voltages may be obtained using an analog-to digital converter, for example. After which, in step 504, the instantaneous terminal voltages are then transformed to a zero direct axis voltage $V_{de}$ and a non-zero quadrature axis voltage $V_{qe}$ using a mathematical transformation. The mathematical transformation may be the direct-quadrature-zero transformation. In step 506, the electrical frequency $f_e$ of the machine is regulated such that the zero direct axis voltage $V_{de}$ is adjusted to have a value of zero. Next, an electrical angle $\Delta\theta_e$ of the machine is determined by applying an integrator to the regulated electrical frequency $F_e$, in step 508. The final electrical angle $\theta_{e1}$ is determined by applying a phase lock loop integrator to the electrical angle of the previous calculation cycle $\theta_{eold}$ and the electrical angle $\Delta\theta_e$, in step 510. Then, in step 512, the optimum torque angle $\Delta\theta_{eoptimize}$ is determined for the machine. In step 514, the new electrical angle of the machine $\theta_{enew}$ is obtained by applying a summation node to the final electrical angle $\theta_{e1}$ and the optimized torque angle $\Delta\theta_{eoptimize}$. Finally, the current vector of the machine is regulated such that the current vector is perpendicular to the new electrical angle $\theta_{enew}$ of the machine, in step 516.

Thus, the above described method, system, and computer-readable medium in accordance with the embodiments of the present invention, as can now be fully appreciated, provides a very effective method for optimizing the torque control for a permanent magnet machine.

The invention has been described through a preferred embodiment. However, various modifications can be made without departing from the scope of the invention as defined by the appended claims and legal equivalents.

What is claimed is:

1. A method for sensorless torque control by determining a rotor position using terminal voltages and currents of an ironless permanent-magnet machine to perform sensorless motoring and/or generation operations, comprising:

obtaining instantaneous terminal voltages of the machine;

transforming the instantaneous terminal voltages to a zero direct axis voltage and a non-zero quadrature axis voltage;

filtering the transformed instantaneous terminal voltages;

regulating the electrical frequency of the permanent-magnet machine such that the zero direct-axis voltage is adjusted to have a value of zero;

determining a non-final electrical angle of the permanent-magnet machine by applying an integrator to the regulated electrical frequency of the machine;

determining a final electrical angle of the of the machine by integrating the non-final electrical angle and an electrical angle from a previous calculation cycle; and regulating the current vector of the machine such that the current vector is perpendicular to the final electrical angle of the machine, thereby optimizing the torque of the machine.

2. The method of claim 1, wherein integrating the non-final electrical angle and an electrical angle from a previous calculation cycle comprises using a phase-locked loop (PLL) to track angular position by adjusting reference frame angles.

3. The method of claim 2, wherein the PLL is a type-II PLL.

4. A system for sensorless torque control by determining a rotor position using terminal voltages and currents of an ironless permanent-magnet machine to perform sensorless motoring and/or generation operations, comprising:
means for obtaining instantaneous terminal voltages of the machine;
means for transforming the instantaneous terminal voltages to a zero direct axis voltage and a non-zero quadrature axis voltage;
means for filtering the transformed instantaneous terminal voltages;
means for regulating the electrical frequency of the permanent-magnet machine such that the zero direct-axis voltage is adjusted to have a value of zero;
means for determining a non-final electrical angle of the permanent-magnet machine by applying an integrator to the regulated electrical frequency of the machine;
means for determining a final electrical angle of the of the machine by integrating the non-final electrical angle and an electrical angle from a previous calculation cycle; and
means for regulating the current vector of the machine such that the current vector is perpendicular to the final electrical angle of the machine, thereby optimizing the torque of the machine.

5. The system of claim 4, wherein integrating the non-final electrical angle and an electrical angle from a previous calculation cycle comprises using a phase-locked loop (PLL) to track angular position by adjusting reference frame angles.

6. The system of claim 5, wherein the PLL is a type-II PLL.

7. A non-transitory computer-readable medium for sensorless torque control by determining a rotor position using terminal voltages and currents of an ironless permanent-magnet machine to perform sensorless motoring and/or generation operations, comprising:
means for obtaining instantaneous terminal voltages of the machine;
means for transforming the instantaneous terminal voltages to a zero direct axis voltage and a non-zero quadrature axis voltage;
means for filtering the transformed instantaneous terminal voltages;
means for regulating the electrical frequency of the permanent-magnet machine such that the zero direct-axis voltage is adjusted to have a value of zero;
means for determining a non-final electrical angle of the permanent-magnet machine by applying an integrator to the regulated electrical frequency of the machine;
means for determining a final electrical angle of the of the machine by integrating the non-final electrical angle and an electrical angle from a previous calculation cycle; and
means for regulating the current vector of the machine such that the current vector is perpendicular to the final electrical angle of the machine, thereby optimizing the torque of the machine.

8. The non-transitory computer-readable medium of claim 7, wherein integrating the non-final electrical angle and an electrical angle from a previous calculation cycle comprises using a phase-locked loop (PLL) to track angular position by adjusting reference frame angles.

9. The non-transitory computer-readable medium of claim 8, wherein the PLL is a type-II PLL.

10. A computer-implemented method for sensorless torque control by determining a rotor position using terminal voltages and currents of an ironless permanent-magnet machine to perform sensorless motoring and/or generation operations, comprising:
obtaining instantaneous terminal voltages of the machine;
transforming the instantaneous terminal voltages to a zero direct axis voltage and a non-zero quadrature axis voltage;
filtering the transformed instantaneous terminal voltages;
regulating the electrical frequency of the permanent-magnet machine such that the zero direct-axis voltage is adjusted to a value of zero;
determining a non-final electrical angle of the machine from the regulated electrical frequency;
determining a final electrical angle of the of the machine by integrating the non-final electrical angle and an electrical angle from a previous calculation cycle;
optimizing the electrical angle by observing the DC power at an input of an inverter that drives the machine; and
regulating the current vector of the machine such that the current vector is perpendicular to the final electrical angle of the machine, thereby optimizing the torque of the machine.

11. The computer-implemented method of claim 10, wherein integrating the non-final electrical angle and an electrical angle from a previous calculation cycle comprises using a phase-locked loop (PLL) to track angular position by adjusting reference frame angles.

12. The computer-implemented method of claim 11, wherein the PLL is a type-II PLL.

13. A system for sensorless torque control by determining a rotor position using terminal voltages and currents of an ironless permanent-magnet machine to perform sensorless motoring and/or generation operations, comprising:
means for obtaining instantaneous terminal voltages of the machine;
means for transforming the instantaneous terminal voltages to a zero direct axis voltage and a non-zero quadrature axis voltage;
means for filtering the transformed instantaneous terminal voltages;
means for regulating the electrical frequency of the permanent-magnet machine such that the zero direct-axis voltage is adjusted to a value of zero;
means for determining a non-final electrical angle of the machine from the regulated electrical frequency;
means for determining a final electrical angle of the of the machine by integrating the non-final electrical angle and an electrical angle from a previous calculation cycle;
means for optimizing the electrical angle by observing the DC power at an input of an inverter that drives the machine; and
means for regulating the current vector of the machine such that the current vector is perpendicular to the final electrical angle of the machine, thereby optimizing the torque of the machine.

14. The system of claim 13, wherein integrating the non-final electrical angle and an electrical angle from a previous calculation cycle comprises using a phase-locked loop (PLL) to track angular position by adjusting reference frame angles.

15. The system of claim 14, wherein the PLL is a type-II PLL.

16. A system comprising:
an ironless permanent-magnet machine; and
a circuit configured to effect sensorless torque control of the ironless permanent-magnet machine by determining a rotor position using terminal voltages and currents of the ironless permanent-magnet machine, the circuit operative to:
obtain instantaneous terminal voltages of the machine;
transform the instantaneous terminal voltages to a zero direct axis voltage and a non-zero quadrature axis voltage;
filter the transformed instantaneous terminal voltages;
regulate the electrical frequency of the permanent-magnet machine such that the zero direct-axis voltage is adjusted to have a value of zero;
determine a non-final electrical angle of the permanent-magnet machine by applying an integrator to the regulated electrical frequency of the machine;
determine a final electrical angle of the of the machine by integrating the non-final electrical angle and an electrical angle from a previous calculation cycle; and
regulate the current vector of the machine such that the current vector is perpendicular to the final electrical angle of the machine, thereby optimizing the torque of the machine.

17. The system of claim 16, wherein integrating the non-final electrical angle and an electrical angle from a previous calculation cycle comprises using a phase-locked loop (PLL) to track angular position by adjusting reference frame angles.

18. The system of claim 17, wherein the PLL is a type-II PLL.

* * * * *